United States Patent [19]

Pope et al.

[11] 4,045,039
[45] Aug. 30, 1977

[54] ADJUSTABLE CLAMPING JAW FOR CHUCKS

[75] Inventors: James W. Pope, Indianapolis; Max E. Overpeck, Mooresville, both of Ind.

[73] Assignee: Wallace Murray Corporation, New York, N.Y.

[21] Appl. No.: 715,964

[22] Filed: Sept. 13, 1976

[51] Int. Cl.² .......................................... B23B 31/12
[52] U.S. Cl. ................................................. 279/123
[58] Field of Search ................ 279/123, 110; 269/257

[56] References Cited

U.S. PATENT DOCUMENTS

| 2,726,092 | 12/1955 | Daniels | 279/110 |
| 3,166,336 | 1/1965 | Goodrum | 279/123 |

*Primary Examiner*—Gil Weidenfeld
*Attorney, Agent, or Firm*—Thomas J. Greer, Jr.

[57] ABSTRACT

An adjustable clamping jaw assembly for a lathe chuck. The jaw is adjustable by assuming any one of several discrete positions relative to an elongated jaw base upon which it is mounted. Such adjustment is carried out by a keyway in the elongated jaw base, or key, and a rotatable tumble block having a plurality of keyways.

16 Claims, 5 Drawing Figures

FIG.1.
FIG.2.
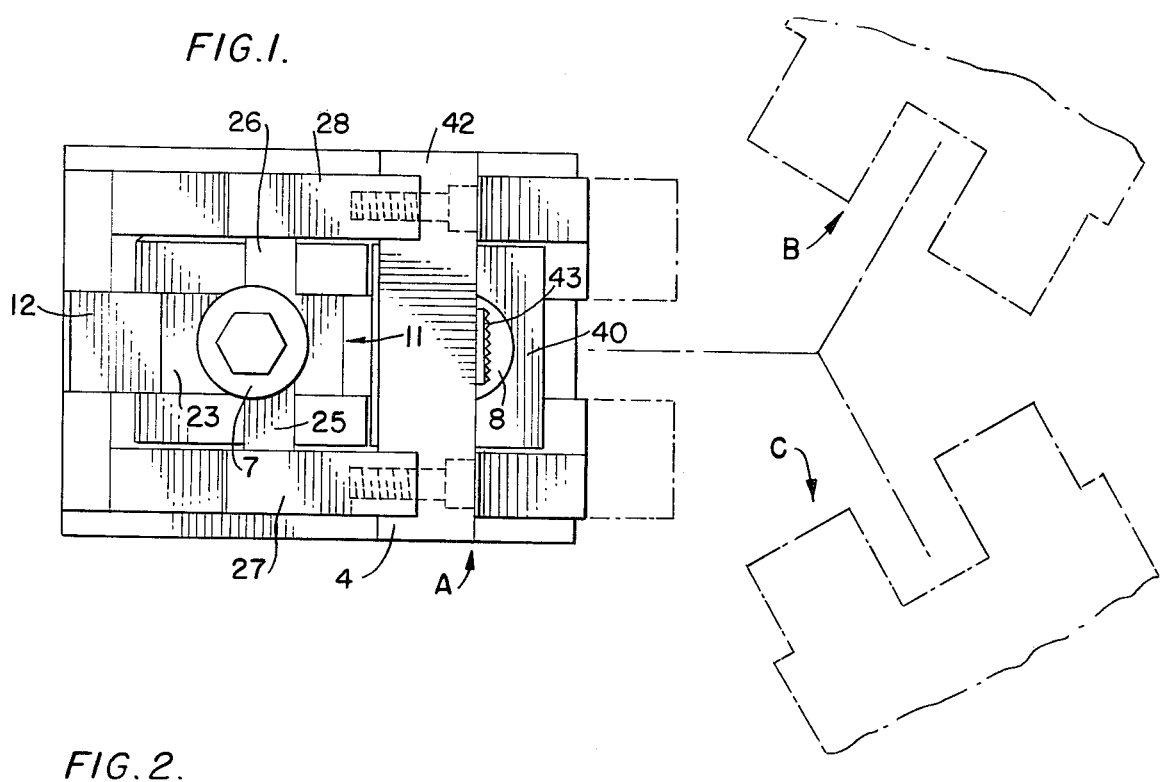
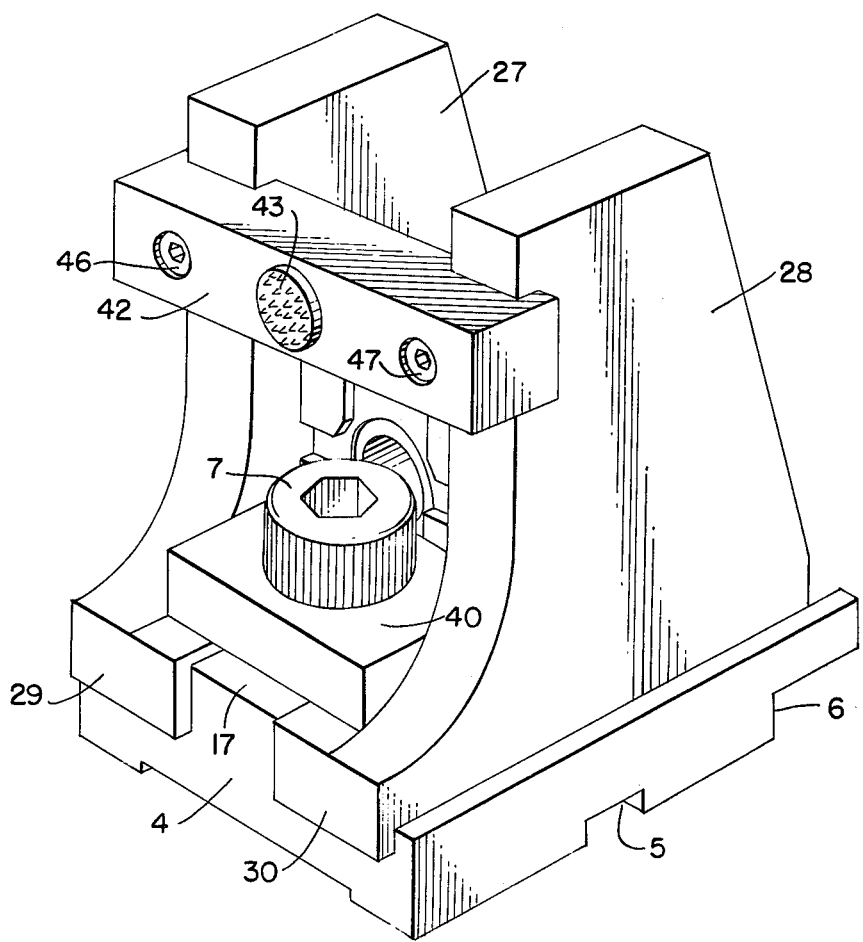

U.S. Patent  Aug. 30, 1977  Sheet 2 of 2  4,045,039
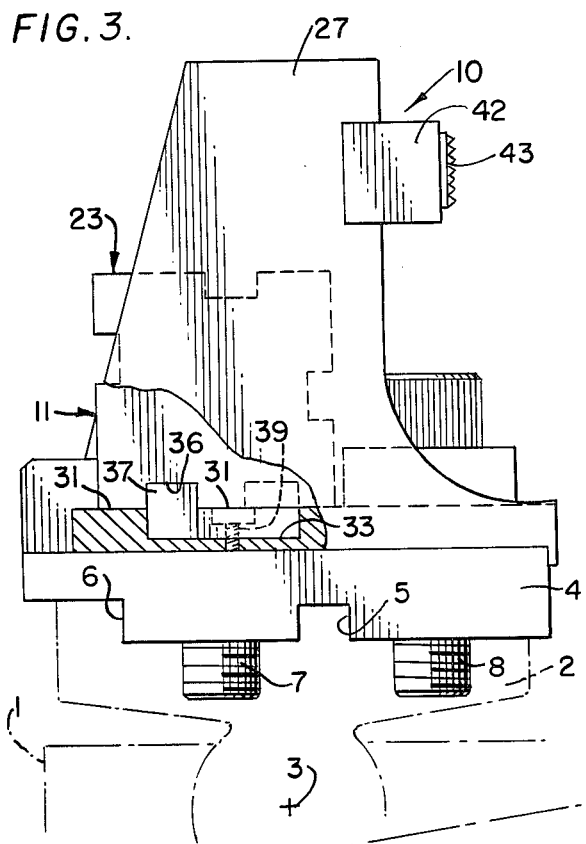
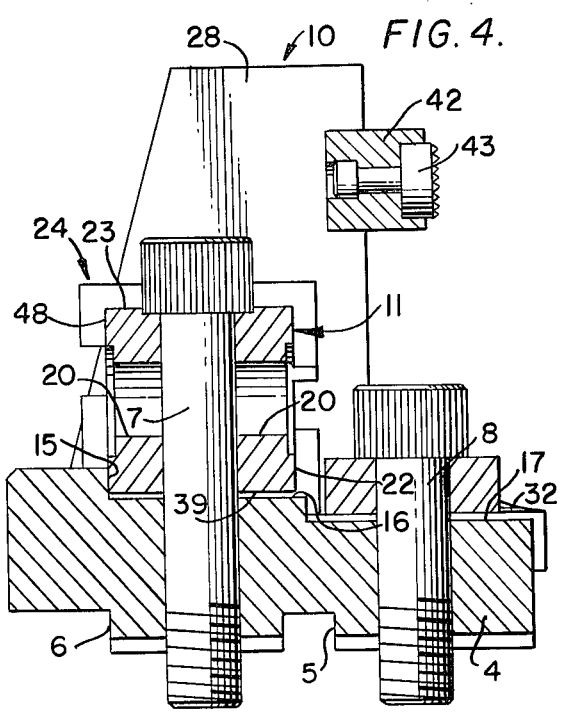
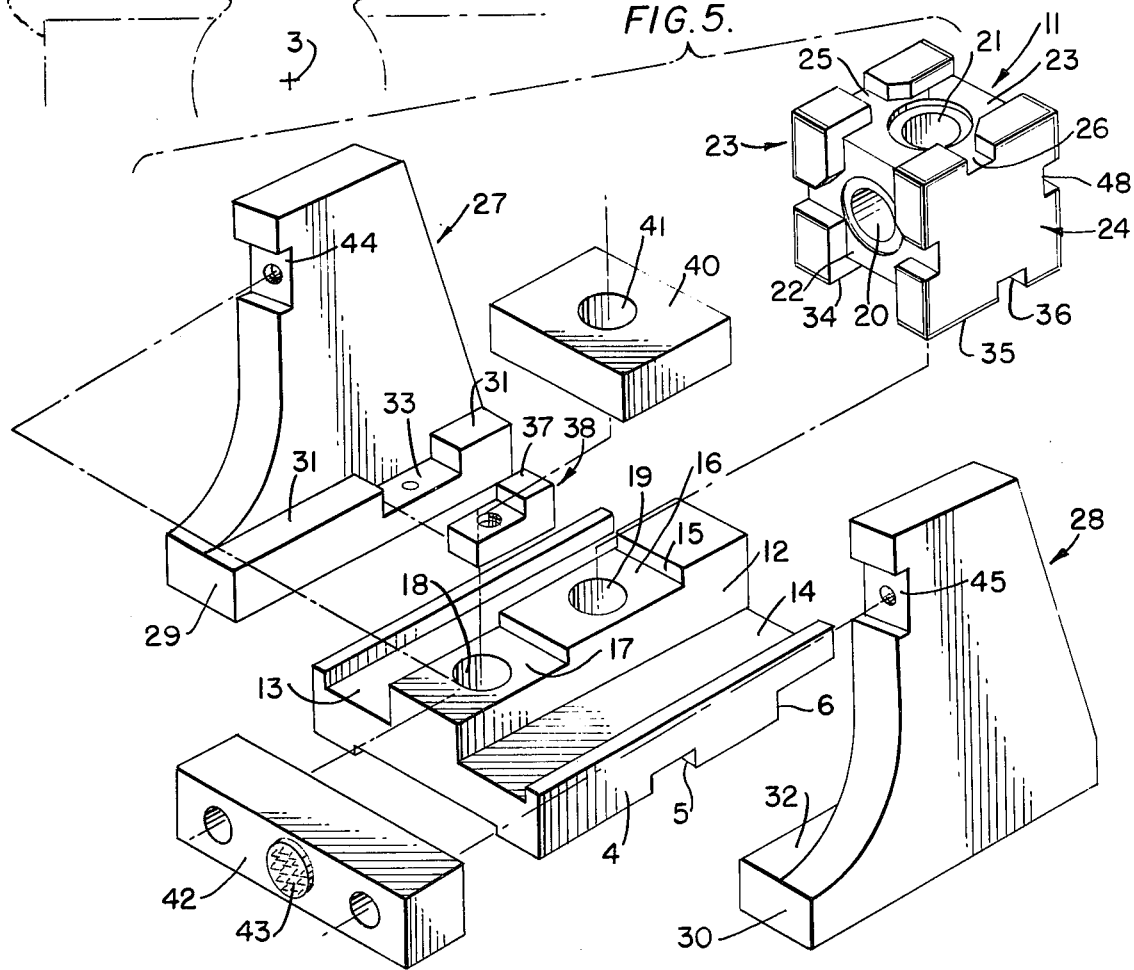

ADJUSTABLE CLAMPING JAW FOR CHUCKS

This invention relates to machine tool chucks and is directed in particular to incrementally adjustable jaws therefor. Chucks which are used to engage and hold a workpiece typically employ plural jaws movable in some fashion between relatively closed and relatively opened position. As will be appreciated by those skilled in the art, various mechanism may be employed to effect these movements as, for example, the scroll or spiral arrangements often employed in three jaw chucks, the individual radial screw adjustment often employed in four jaw chucks, and various arrangements such as a rocking or camming drive often employed in quick-change power chucks. With all of these prior art chuck types the use of a compound, adjustable jaw assembly has been proposed. By compound, adjustable jaw assembly is meant that type of jaw assembly which includes a bottom or master jaw which is carried by the chuck body and a top jaw part carried in turn by the master jaw. The top jaw engages the workpieces and is adjustable with respect to the jaw base. The jaw base is carried by the master jaw, while the latter is movable with respect to the chuck body to exert the workpiece-holding force.

Although such compound assemblies are useful with any type of chuck arrangement, as for example, in clamping irregular workpieces, they are perhaps of greatest utility in connection with quick-change power chucks which have set or constant open/close positions. Typical examples of such power chucks are to be seen in the following patents which are incorporated herein by reference:

U.S. Pat. Nos. 3,219,356 issued to Wilterdink; 3,560,010 issued to Hohwart; 3,730,539 issued to Swanson; and 3,751,053 issued to Swanson.

Adjustable compound jaw assemblies are particularly useful with power chucks because they permit various sizes of workpieces to be held within the capability of the set or constant open/close positions of the chuck master jaws by the radial movement capability of the top jaws with respect to their jaw bases.

However, one must not resort to a jaw base/top jaw arrangement which is too complicated or which relies on threaded or thread-like interengagements which are subjected to clamping force stresses, else the inherent weakness or deformation characteristics thereof will act materially to limit the effectiveness of the assembly. All components should be rugged and it is of special concern that the elements which effect the adjustable connection between top and jaw bases be rugged and free from excessive stresses or deformation in use.

The present invention meets all of the above criteria and additionally is of such construction as to allow a series of incremental adjustments of the top jaws with respect to their jaw bases as will cover a wide range of total adjustment while each incremental change is small enough to be accommodated within the compensation and travel range of modern power chucks, see particularly the above-mentioned U.S. Pat. No. 3,751,053 to Swanson.

Basically, the invention disclosed and claimed herein involves the use of a tumble block as the principal element acting between a jaw base and the top jaw to establish the incremental setting of the top jaw with respect to the base or bottom jaw. The tumble block may have four sides each of which has a different setting of key and slot engagement between the top jaw and jaw base so that any one side effects a setting different from all of the other three. The tumble block is also characterized by the fact that it may be reversed in its orientation to achieve four additional different settings. Additionally, the assembly may incorporate reversible keys which, by reason of their two reversed positions provide an additional eight possible settings, making a total of sixteen possible settings of the top jaw with respect to the jaw base. In a typical construction, each incremental change effects a top jaw movement of ⅛ inch, which is within the compensation and travel range of a modern chuck, thus allowing the chuck assembly to accommodate and infinite variety of diameters and/or sizes of parts.

IN THE DRAWINGS

FIG. 1 is a plan view illustrating a compound jaw assembly according to this invention and illustrating in phantom lines portions of two other jaw assemblies such as might be incorporated in a three-jaw chuck device;

FIG. 2 is a perspective view of the compound jaw assembly,

FIG. 3 is a side elevation of the compound jaw assembly with portion broken away, FIG. 4 is a sectional view of the compound jaw assembly, FIG. 5 is an exploded perspective view of the compound jaw assembly.

With reference to FIG. 3, a conventional chuck construction is shown in phantom lines which illustrate a portion of the chuck body 1 which carries a master jaw 2 for rocking motion about the center 3, the rocking motion being effected by any conventional power means as is, for example, disclosed in U.S. Pat. No. 3,560,010. The rocking motion is of course limited and constitutes set or constant open/closed positions of the master jaw 2.

The illustrative embodiment of this invention includes the jaw base 4 which is provided with a transverse slot 5 receiving a step or land formed on the master jaw 2 and snugly fitted therein, and a stepped surface 6 which abuts a similar step in the master jaw 2. The bolts 7 and 8 threadedly engage in the master jaw and firmly engage the jaw base 4 thereagainst. This arrangement assures a rigid connection between the parts 2 and 4 which effectively locks these parts together to resist the forces generated as a result of workpiece holding action.

The jaw base 4 mounts the top jaw 10 and the tumble block 11 controls the relative incremental displacement (left and right in FIG. 3) of the top jaw 10 relative to the bottom jaw base 4.

Essentially, the tumble block 11 effects a slot and key connection between the two parts 4 and 10 which is adjustable in small, equal increments, correspondingly to shift the setting of the top jaw 10 relative to the bottom jaw base 4.

The relationship of parts can be seen in FIG. 5 to which reference is now had. In FIG. 5, it will be noted that the jaw base 4 is provided with a centrally disposed and longitudinally extending pedestal portion 12, and on either side thereof with a two guide slots 13 and 14. The upper surface of the pedestal portion 12 is stepped to provide the rear abutment face 15, the saddle portion 16 and the clearance land 17, the jaw base 4 being additionally provided with the two bores 18 and 19 which permit the previously mentioned bolts 7 and 8 to pass therethrough. The tumble block 11 is in the form of a precision machined cube having the orthogonally related bores 20 and 21 formed therein to pass the bolts 7 and a central band of the tumble block is slotted or recessed as indicated by reference characters 22 and 23 on each of the four sides thereof to present the opposite side key slot block portions indicated generally by the reference characters 23 and 24. The tumble block 11 is provided with transverse keyways on each of its four sides which as shown are of depths equal to those of the slots 22, 23 so as to present aligned pairs of keyways in the two block portions 23 and 24 as, for example, those indicated by the reference characters 25, 26.

The top jaw assembly 10 is formed by the opposite, upstanding side plate portions 27 and 28 having widened bottom rail portions 29 and 30 accurately machined snugly but slidably to be received in the ways 13 and 14 of the jaw base 4. The parts 27 and 28 are accurately machined to present the seating surfaces 31 and 32 respectively each of which is provided with an elongated key slot such as the slot 33 indicated in FIG. 5. The parts are dimensioned such that when the tumble block 11 is seated over the saddle portion 16 of the jaw base 4, the lower surfaces 34 and 35 are seated upon the respective surfaces 31 and 32 with the keyway portions 36 thereof receiving the upstanding key portion 37 of the corresponding key block 38 which is seated within the corresponding key slot 33 and held in position therein by a suitable machine screw element such as that indicated in FIG. 3 at 39. It will be appreciated that the height of the two surfaces 31 and 32 is slightly above the clearance land or surface 17, see particularly FIG. 4 and that, likewise, height of the saddle portion 16 is such as to provide a slight clearance between the surface 39 of the central band portion of the tumble block 11 which faces downwardly while the surfaces 34 and 35 engage the surfaces 31 and 32. The clamping plate 40 is provided with a central bore 41 passing the bolt 8 and will be seen to bridge between the two surfaces 31 and 32 so that both bolts 7 and 8 effect a clamping force firmly to seat the rail portions 29 and 30 of the plates 27 and 28 within the ways 13 and 14 thereby rigidly to hold the assembly in the adjusted position as determined by the positioning of the tumble block 11 and of the key blocks 38 as is described with greater particularity hereinafter. The top jaw part is completed by the bridging block 42 which may be provided with a hardened jaw part 43, the opposite ends of the bridging block 42 being received in th recesses 44 and 45 adjacent the upper portions of the plates 27 and 28 and rigidly secured thereto by suitable machine screws 46 and 47 as is illustrated in FIG. 2.

Considering the relative arrangements of parts as is shown in FIG. 5, it will be appreciated that the lower marginal edge of the rear face 48 of the center band of the tumbler block 11 will be engaged against the abutment surface 15, see particularly FIG. 4 and that the transverse slots 36 will receive the key portion 37. Thus, the spacing between the rear face 48 and the notch 36 will determine the relative position of the top jaw assembly 10 relative to the jaw base 4. By loosening the bolt 8 and removing the bolt 7, the tumbler block can be rotated 90° in the plane containing the two orthogonal bores 20, 21 to place the lower edge of the surface 23 of the center band of the tumble block 11 against the abutment surface 15 with the bolt 7 now passing through the bore 20 and now the incremental adjustment of the top jaw assembly 10 relative to the jaw base 4 will be determined by the spacing between the surface 23 and the transverse keyway slot 48. Similarly, third and fourth positions of the top jaw 10 may be achieved by similar rotations of the tumbler block 11. Further, the dimensions of the center band of the tumbler block 11 and of the various spacings of the transverse keyways are such that when the tumbler block 11 is rotated 180° in a plane either transverse to the axis of the bore 20 or switch the sides on which the block portions 23 and 24 are placed, an additional four incremental settings, different from the previously mentioned four settings is achieved, with all of the incremental settings being such that the increments are equal and are of small amounts, for example $\frac{1}{8}$ inch, so as to be within the compensating and travel range of the master jaw as effected by rotation of the same about the center 3 under the action of the associated power mechanism.

Additionally, the two keys 38 may be rotated 180° from the position shown in FIG. 5 or in FIG. 3 and the dimension of the keys are such that when they are reversed a further eight incremental adjustments may be achieved by manipulation of the tumbling block 11 in the same fashion as is previously described, thus making a total of sixteen adjustments which can be effected in $\frac{1}{8}$ inch increments over the entire range.

It will be appreciated that each of the jaw plate members 27 and 28 may be provided with an additional key recess 33 properly positioned so as to achieve a further sixteen possible incremental adjustments, again extending over a total range of $\frac{1}{8}$ increments. Furthermore a kinematic inversion of the functional components can be effected. That is to say, the structure may be such that the tumbler block 11 abuts against the movable top jaw assembly 10 while the keys 38 are associated with the jaw base 4, in which case the bores 18 and 19 for accommodating the bolts 7 and 8 will have to be elongated or a different type of bolt hold down construction will be required. The reader will also comprehend that inside as well as outside work-holding engagement may be effected. Although no detailed chuck structure is shown in the drawings, beyond the partial illustration of FIG. 3, any plural jaw arrangement and/or drive therefor may be employed. FIG. 1 illustrates a typical three jaw arrangement employing three of the jaw assemblies A, B and C of this invention, but this is merely illustrative of that particularlar jaw arrangement and it will be understood that other and different arrangements may be employed as desired.

What is claimed is:

1. An incrementally adjustable jaw assembly for machine tool chucks, comprising in combination;
    a. a jaw base attached to a master jaw of a chuck and a top jaw mounted for incremental relative movement with respect to said jaw base,
    b. tumble block and key means for providing an incrementally adjustable abutment between said top jaw and said jaw base which determines the relative position between said top jaw and said jaw base,
    C. said tumble block including a multi-faceted block having differently positioned keyways in its faces, said key means being engageable with a selected of one said keyways for adjustably positioning said incremental adjustable abutment of said tumble block relative to said jaw base, and means for securing said top jaw to said tumble block and for clamping said top jaw and said jaw base together.

2. An incrementally adjustable jaw assembly as defined in claim 1 wherein said tumble block and key means comprises a generally cubical tumble block presenting opposite side faces and four remaining faces, a plurality of the six tumble block faces carrying a transverse keyway, and at least one key for reception in selected ones of said keyways, said tumble block abutting against one of said top jaw and said jaw base, and said key being locked to the other.

3. An incrementally adjustable jaw assembly as defined in claim 2 wherein said transverse keyways are so located as to achieve double the number of incremental positions of said top jaw in response to combined tumbling of the block to engage the different keyways with the key and rotation of the block 180° about an axis contained in the plane of tumbling.

4. An incrementally adjustable jaw assembly as defined in claim 3 wherein said key is asymetrical and is positionable in either of two positions displaced by 180° whereby to achieve double the number if incremental positions of the top jaw relative to the jaw base.

5. An incrementally adjustable jaw assembly as defined in claim 4 wherein said tumble block abuts said jaw base and said key is engaged with said top jaw.

6. An incrementally adjustable jaw assembly as defined in claim 3 wherein said tumble block abuts said jaw base and said key is engaged with said top jaw.

7. An incrementally adjustable jaw assembly as defined in claim 2 wherein said tumble block abuts said jaw base and said key is engaged with said top jaw.

8. An incrementally adjustable jaw assembly as defined in claim 2 wherein said tumble block is longitudinally slotted through each of said four faces to present outwardly projecting opposite side tumble block portions, said jaw base including a saddle portion straddled by said opposite side tumble block portions whereby laterally to position said tumble block with respect to said jaw base.

9. An incrementally adjustable jaw assembly as defined in claim 8 wherein said jaw base presents an abutment surface engaging a slot face of the tumble block in each tumbled positioned thereof.

10. An incrementally adjustable jaw assembly as defined in claim 9 wherein said top jaw includes opposite side plates having rail portions straddling said saddle portion and presenting bearing surfaces upon which faces of the opposite side block portions bear.

11. An incrementally adjustable jaw assembly for machine tool chucks which includes a jaw base adapted for limited movement between open and closed positions, a top jaw carried by said jaw base for incremental positioning thereof to accommodate for workpieces of different dimensions, and means for locking said top jaw to said jaw base in a plurality of incremental positions with respect thereto, said means including a multifaceted block having differently positioned keyways in its faces, key means engageable with a selected one of said keyways for determining the incremental position of said top jaw relative to said jaw base, and a locking bolt passing through said multi-faceted block and securely clamping said top jaw, said block and said jaw base together.

12. An incrementally adjustable jaw assembly as defined in claim 11 wherein said block is a cube whereby the block may be reversed to entend the member of incremental position available.

13. An incrementally adjustable jaw assembly as defined in claim 12 wherein said key means includes an asymethrical key adapted to be positioned in either one of two positions to extend the number of incremental positions attainable.

14. An incremental adjustable jaw assembly as defined in claim 11 wherein said means includes an asymethrical key adapted to be positioned in either one of two positions to extend the number of incremental positions attainable.

15. An incrementally adjustably jaw assembly as defined in claim 11 wherein said top jaw includes opposite side plates slidably engaging the jaw base, said block being located between said side plates and bearing at opposite sides thereof upon the repective side plates, said key means comprising a pair of keys fixedly carried by said side plates and said block being seated in abutting relation on said jaw base.

16. An incrementally adjustable jaw assembly as defined in claim 2 wherein said key is asymetrical and is positionable in either of two positions displaced by 180° whereby to achieve double the number if incremental positions of the top jaw relative to the jaw base.

* * * * *